United States Patent
Nakao et al.

(10) Patent No.: US 9,946,453 B2
(45) Date of Patent: Apr. 17, 2018

(54) DISPLAY DEVICE AND PROGRAM

(71) Applicant: NTT DOCOMO, INC., Tokyo (JP)

(72) Inventors: Naoyuki Nakao, Tokyo (JP); Hitoshi Obata, Tokyo (JP)

(73) Assignee: NIT DOCOMO, INC., Tokyo (JP)

( * ) Notice: Subject to any disclaimer, the term of this patent is extended or adjusted under 35 U.S.C. 154(b) by 228 days.

(21) Appl. No.: 14/382,982

(22) PCT Filed: Apr. 3, 2013

(86) PCT No.: PCT/JP2013/060187
§ 371 (c)(1),
(2) Date: Sep. 4, 2014

(87) PCT Pub. No.: WO2013/154003
PCT Pub. Date: Oct. 17, 2013

(65) Prior Publication Data
US 2015/0040050 A1    Feb. 5, 2015

(30) Foreign Application Priority Data
Apr. 12, 2012  (JP) .................................. 2012-091113

(51) Int. Cl.
G06F 3/048     (2013.01)
G06F 3/0488    (2013.01)
G06Q 10/10     (2012.01)

(52) U.S. Cl.
CPC ......... *G06F 3/0488* (2013.01); *G06Q 10/107* (2013.01)

(58) Field of Classification Search
CPC ........................... G06F 3/0488; G06Q 10/107
See application file for complete search history.

(56) References Cited

U.S. PATENT DOCUMENTS

| | | | | |
|---|---|---|---|---|
| 5,528,260 A | * | 6/1996 | Kent | ........................ G09G 5/14 |
| | | | | 345/684 |
| 2005/0088410 A1 | | 4/2005 | Chaudhri | |
| 2008/0168290 A1 | | 7/2008 | Jobs et al. | |
| 2009/0085864 A1 | * | 4/2009 | Kutliroff | ................. A63F 13/10 |
| | | | | 345/156 |

(Continued)

FOREIGN PATENT DOCUMENTS

| | | |
|---|---|---|
| JP | 2001265481 | 9/2001 |
| JP | 2003323258 | 11/2003 |

(Continued)

OTHER PUBLICATIONS

First Notification of Office Action for Chinese Patent Application No. 201380002602.4, dated Feb. 1, 2016.

(Continued)

*Primary Examiner* — Sara England
(74) *Attorney, Agent, or Firm* — MKG, LLC

(57) ABSTRACT

A display device calculates an operation amount of a user's input operation based on a detected indicated position. Display device displays component images on display surface based on the operation amount calculated. If display device determines that the indicated position is no longer detected, display device determines whether the calculated operation amount is smaller than or equal to a threshold. If it is determined that the calculated operation amount exceeds the threshold, display device executes an acquiring operation of a newly arrived email.

12 Claims, 9 Drawing Sheets

(56) References Cited

U.S. PATENT DOCUMENTS

| | | | |
|---|---|---|---|
| 2010/0058226 A1* | 3/2010 | Flake .................. | G06F 3/0481 |
| | | | 715/786 |
| 2012/0236037 A1* | 9/2012 | Lessing .................. | G06F 3/017 |
| | | | 345/661 |

FOREIGN PATENT DOCUMENTS

| | | |
|---|---|---|
| JP | 2006-252322 | 9/2006 |
| JP | 2006252322 | 9/2006 |
| JP | 2010170479 | 8/2010 |
| JP | 2010237902 | 10/2010 |

OTHER PUBLICATIONS

Search Report of Chinese Patent Application No. 201380002602.4, dated Jan. 21, 2016.
Extended European Search Report for European Patent Application No. 13776295.1-1507/2837998 PCT/JP2013060187, dated Dec. 3, 2015.
PCT International Search Report issued in International Application No. PCT/JP2013/060187, dated Jul. 9, 2013, pp. 1-2.
Notification of Reasons for Rejection issued in corresponding JP Application No. 2012-091113, dated May 20, 2014, pp. 1-3.
Second Office Action issued in corresponding Chinese Patent Application No. 201380002602.4, dated Sep. 2, 2016, pp. 1-6.
European Office Action for EP Patent Application No. 13776295.1, dated Feb. 21, 2017, 6 pages.

* cited by examiner

DISPLAY DEVICE AND PROGRAM

TECHNICAL FIELD

The present invention relates to a technique for notifying a user that a user's input operation performed on a display device is received.

BACKGROUND ART

When a user performs an input operation, such as a touch operation or drag operation, using a touch screen of a display device, the display device executes an operation according to the user's input operation. If a user operates an operation element, such as a button or key, a user can confirm that the display device receives a user's input operation because the operation element is displaced as a result of the user's input operation. However, in operation of a touch screen, such a displacement of an operation element does not occur. Accordingly, there exists a technique for notifying a user that a user's input operation performed using a touch screen is received. In JP-A-2001-265481 a technique is described in which when a user performs an input operation to turn over a page while a page representing electronic information is displayed on a touch screen, an image of a subsequent page is displayed in a stepwise manner while an image of a current page reduces in size gradually.

In the technique described in JP-A-2001-265481, displaying the image of "the subsequent page" represents an execution of the foregoing notification. This image is displayed as a result of receipt of a user's input operation to turn over a page and execution of an operation in accordance with the user's input operation. If this technique is applied, for example, to a user's input operation to acquire a newly arrived email, the foregoing notification requires that an image be displayed as a result of execution of an operation in accordance with the user's input operation; namely, an image representing a newly arrived email. However, this image is not displayed until an operation for receiving from an email server data that represents content of a newly arrived email by communication with the mail server is executed. Thus, a user has to wait until the operation is terminated before receiving the foregoing notification. In addition, as long as the operation is terminated, only an image representing a result of execution of the operation, namely, in this example, an image representing content of a newly arrived email, has to be displayed, without the foregoing notification being executed. Accordingly, an object of the present invention is to notify a user that a user's input operation is received before an operation according to the user's input operation is executed.

SUMMARY

To solve the foregoing problem, there is provided in the present invention a display device including: a display means that displays an image on a display surface, a detecting means that detects a position indicated by a user using an indicator on the display surface; a calculating means that calculates, based on a result of a detection by the detecting means, an operation amount represented by a distance or a time; a control means that controls the display means to display a plurality of component images constituting a moving image, while switching the plurality of component images based on the operation amount calculated by the calculating means in a predetermined order; and an executing means that executes a determined operation when the operation amount calculated by the calculating means exceeds a threshold.

The control means may control the display means to return to displaying a component image first displayed in the predetermined order when the executing means starts to execute or terminates the determined operation.

The plurality of component images may include a plurality of first component images and a second component image, the plurality of first component images being displayed in the predetermined order, a content of the moving image having a first variation, the second component image being displayed subsequent to the plurality of the first component images, the content having a second variation other than the first variation; and the control means may control the display means to display the plurality of first component images while switching the plurality of first component images in the predetermined order until the operation amount calculated by the calculating means reaches the threshold, and may control the display means to display the second component image by switching from a last of the plurality of first component images when the operation amount exceeds the threshold.

The control means may control the display means to display the plurality of component images while switching the plurality of component images to a reverse order from the predetermined order when the operation amount calculated by the calculating means becomes smaller than a threshold.

The moving image control means may control the display means to display a first component image in the predetermined order before the detecting means detects the position.

The display means may display an image representing an item of information from among a plurality of items of information; and the executing means may execute an operation to acquire information other than the item of information from among the plurality of items of information when the operation amount calculated by the calculating means exceeds the threshold.

In response to the detecting means detecting a shifted position, the calculating means may calculate, as the operation amount, a shifted distance from a start position for a shift to the shifted position, or calculates, as the operation amount, a distance from the start position to the shifted position along a predetermined direction; and the calculating means may prevent the determined operation from being executed when a period of time from when the shift is started to when the operation amount calculated by the calculating means exceeds the threshold, is smaller than or equal to a predetermined value, or is greater than or equal to another predetermined value, otherwise the executing means may execute the determined operation.

The executing means may fix a position of an image displayed at the start position when executing the determined operation.

The display means may display an image representing an item of information from among a plurality of items of information; and the calculating means may calculate, as the operation amount, a distance from the start position to the shifted position along the predetermined direction using a direction in which the item of information is arranged as the predetermined direction.

The executing means may prevent the determined operation from being executed when a period of time from when the shift is started to when the shifted position is no longer detected by the detecting means, is smaller than or equal to a predetermined value, or is greater than or equal to another predetermined value, even if the operation amount calculated by the calculating means exceeds the threshold and the shifted position is no longer detected by the detecting means.

There is provided in the present invention a program for causing a computer of a display device including a display means that displays an image on a display surface, and a detecting means that detects a position indicated by a user using an indicator on the display surface, to execute the steps of: calculating, based on a result of a detection by the detecting means, an operation amount represented by a distance or a time; controlling the display means to display a plurality of component images constituting a moving image, while switching the plurality of component images based on the calculated operation amount in a predetermined order; and executing a determined operation when the calculated operation amount exceeds a threshold.

According to the present invention, it is possible to notify a user that a user's input operation is received before an operation according to the user's input operation is executed.

DETAILED DESCRIPTION

Embodiment

An embodiment of the present invention is described below with reference to the drawings.

Figure 1:
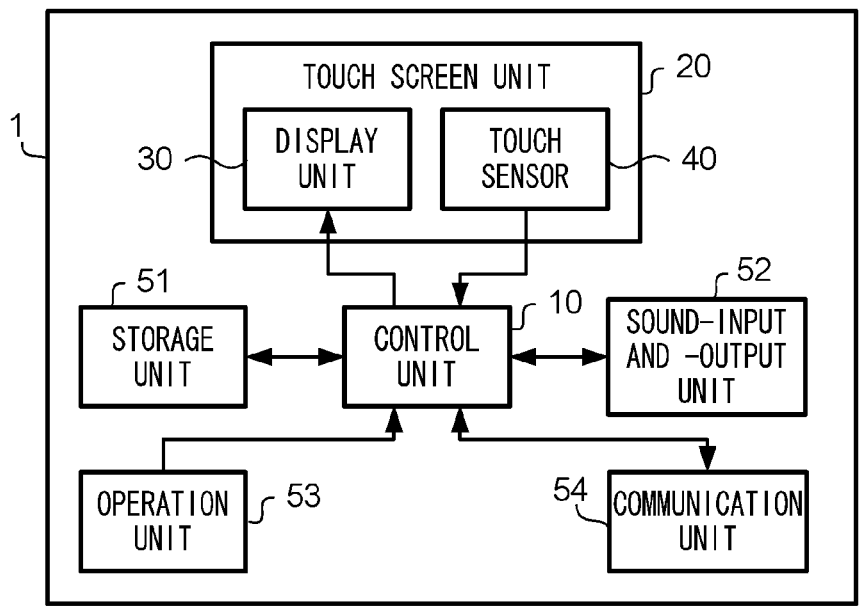
FIG. 1 is a block diagram illustrating a hardware configuration of a display device according to an embodiment.

FIG. 1 is a block diagram illustrating a hardware configuration of display device 1 according to the embodiment. Display device 1 is a mobile telephone including a touch screen (a so-called smart phone). Display device 1 is operated by a user mainly via the touch screen. Display device 1 is a computer including control unit 10, touch screen unit 20, storage unit 51, sound-input and -output unit 52, operation unit 53, and communication unit 54.

Control unit 10 includes an arithmetic unit, such as a Central Processing Unit (CPU), and a memory, such as a Read Only Memory (ROM) and Random Access Memory (RAM). The CPU controls operation of various components of display device 1 by executing a program stored in the ROM or storage 51 using the RAM as a work area. Storage unit 51 is, for example, a storage means, such as a hard disk, to store data and a program that control unit 10 uses for a control. Storage unit 51 also stores software (referred to as email software) for executing an operation such as displaying, creating, and transmitting an email, and an application program such as a browser for displaying a web site.

Touch screen unit 20 is a means for displaying an image and for receiving a user's input operation. Touch screen unit 20 includes display unit 30 and touch sensor 40. Display unit 30 is, for example, a liquid-crystal display. Display unit 30 includes display surface 31 shown in FIG. 3. Display unit 30 displays an image on display surface 31. Touch sensor 40 is about the same size and the same shape as display surface 31. Touch sensor 40 is disposed on display surface 31. A user indicates a position on display surface 31 by using an indicator, such as a finger of the user or a pen-shaped writing implement for a touch sensor (a so-called stylus pen).

Touch sensor 40 includes, for example, an electrostatic capacitance type sensor to detect a position (sampling) (hereinafter, referred to as an "indicated position") that a user indicates using the indicator on display surface 31, through the use of a capacitive coupling between the sensor and indicator. Touch sensor 40 provides control unit 10 with data representing the detected position. Touch sensor 40 executes this detection and provision at a predetermined time interval (in the present embodiment, every 0.1 second). When an image for an operation is displayed on the display surface, a user performs an operation by indicating the image using the indicator. In this case, control unit 10 determines that an image for an operation is displayed at an indicated position that is represented by data provided by touch sensor 40, and executes an operation corresponding to the image.

Sound-input and -output unit 52 includes a speaker, microphone, sound processing circuit, etc. to execute an input and output of a sound in calling. Operation unit 53 includes an operation element used for a user's input operation, such as a button or key, to provide control unit 10 with an operation signal according to the user's input operation. Control unit 10 executes a process according to the operation signal. Communication unit 54 includes an antenna, a communication circuit, etc. to communicate wirelessly with a communications network, which is not shown. Communication unit 54 exchanges data representing a sound by communicating with another mobile phone via the communications network, or exchanges data representing a character string, an image, a moving image, etc. by communicating with a mail server, which provides an email service, or with a Social Networking Service (SNS) server, which provides a SNS.

In display device 1, the following functions are implemented by control unit 10 executing a program to control various components, or by display unit 30 and touch sensor 40 operating independently.

Figure 2:
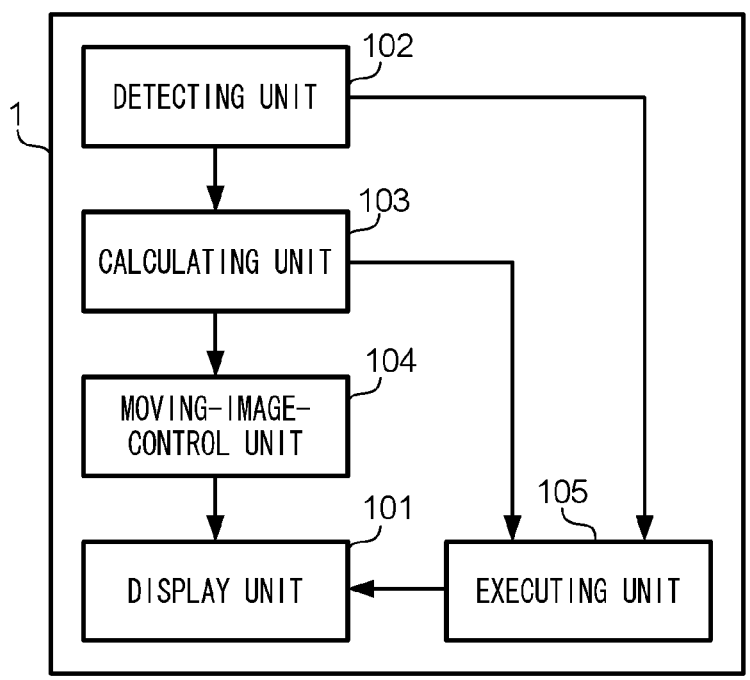
FIG. 2 is a block diagram illustrating functions implemented by a display device.

FIG. 2 is a block diagram illustrating functions implemented by display device 1. Display device 1 includes display unit 101, detecting unit 102, calculating unit 103, moving-image-control unit 104, and executing unit 105. Display unit 101 is a displaying means that displays an image on a display surface included in display unit 30 shown in FIG. 1. Display unit 101 is implemented by an operation of display unit 30. Detecting unit 102 is a detecting means that detects the foregoing indicated position (sampling) (a position indicated by a user using the indicator on display surface 31). Detecting unit 102 is implemented by an operation of touch sensor 40. Detecting unit 102 provides calculating unit 103 and executing unit 105 with data representing a detection result at a predetermined time interval (in the present embodiment, every 0.1 second as described above).

Calculating unit 103 is a calculating means that calculates a predetermined operation amount when a user performs a drag operation. The drag operation referred to here is an operation in which a user shifts an indicated position while maintaining contact with display surface 31. This drag operation causes an indicated position detected by detecting unit 102 to shift. That is, calculating unit 103 calculates the foregoing predetermined operation amount when an indicated position detected by detecting unit 102 shifts. The predetermined operation amount referred to here is a distance, along a predetermined direction, from a start position from which an indicated position is shifted (hereinafter, referred to as a start position) to the indicated position that is shifted (hereinafter, referred to as a shifted position). In detail, the shifted position refers to an indicated position detected as a result of a shift. Calculating unit 103 is implemented by a cooperation of control unit 10 and storage unit 51. Calculating unit 103 provides a moving-image-control unit 104 and executing unit 105 with a calculation result. Moving-image-control unit 104 is a moving image control means that controls display means 101 to display a plurality of component images constituting a moving image, while switching the plurality of component images based on the operation amount calculated by calculating unit 103 in a predetermined order. In the following description, this order is referred to as a "display order." The "moving image" referred to here is a group of images, such as a series of drawings or photos, that vary gradually by switching the group of images sequentially to appear to move (a plurality of component images is an example of the group of images). The plurality of component images to be displayed by moving-image-control unit 104 is stored in storage unit 51. Moving-image-control unit 104 is implemented by a cooperation of control unit 10 and storage unit 51.

Executing unit 105 is an executing means that executes a determined operation (hereinafter, referred to as a "specific operation") when the shifted position is no longer detected by detecting unit 102 while the operation amount calculated by calculating unit 103 exceeds a threshold. The threshold is preset and is stored in storage unit 51. The specific operation referred to here is an operation, for example, for acquiring an email that is newly arrived (a so-called newly arrived email) by communication with the mail server to display an image representing content of the email. In the following description, this specific operation is referred to as an acquiring operation of a newly arrived email. In the acquiring operation of a newly arrived email, when there is no newly arrived email, information to that effect is displayed. Executing unit 105 is implemented by a cooperation of control unit 10 and various components corresponding to the specific operation. If the acquiring operation of a newly arrived email is executed as the specific operation, executing unit 105 is implemented by a cooperation of control unit 10, storage unit 51, and communication unit 54.

Each of the functions shown in FIG. 2 is implemented while, for example, display device 1 displays a list of emails (an email list).

Figure 3:
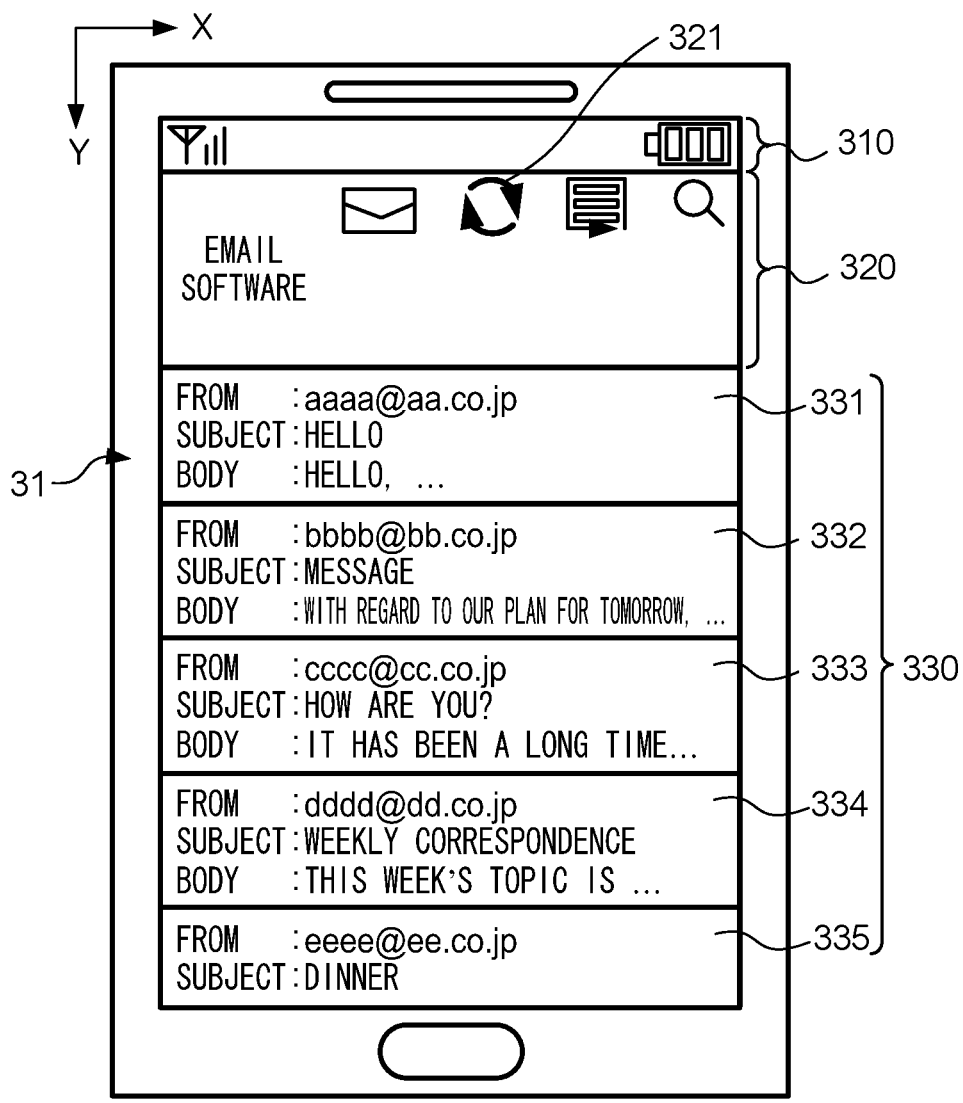
FIG. 3 is a diagram illustrating an example of an email list.

FIG. 3 is a diagram illustrating an example of the email list displayed by display device 1. FIG. 3 illustrates an exterior of display device 1 as viewed from a front of display surface 31 included in display unit 30. Display surface 31 is rectangular. In FIG. 3, an X-Y Cartesian coordinate system in two dimensions is assumed with a short side of display surface 31 as an X-axis and with a long side of display surface 31 as a Y-axis. The origin of the Cartesian coordinate system is a left-upper vertex of display surface 31 shown in FIG. 3. FIG. 3 illustrates the imaginary origin, X-axis and Y-axis. In the following description, an X-axial positive direction is referred to as a "right direction," an X-axial negative direction is referred to as a "left direction," a Y-axial positive direction is referred to as a "downward direction," and a Y-axial negative direction is referred to as an "upward direction." Additionally, directions parallel to the X-axes are referred to as left and right directions, and directions parallel to the Y-axes are referred to as up and down directions. It is to be noted that in FIG. 3 only arrow X representing the X-axial positive direction and arrow Y representing the Y-axial positive direction are illustrated.

On display surface 31, device image 310, email software image 320, and list image 330 are displayed. Device image 310 is an image representing a status of display device 1. Device image 310 includes an image representing a status of a signal reception by the antenna of communication unit 54, and an image representing a battery remaining quantity. Email software image 320 is an image used for an operation of email software or an image for notifying an execution state of email software. Email software image 320 includes update icon 321. Update icon 321 is an example of the foregoing image for an operation. When update icon 321 is operated by a user, the acquiring operation of a newly arrived email is executed.

List image 330 is an image representing an email list containing contents of a plurality of emails in a list format. List image 330 includes five email images 331, 332, 333, 334, and 335. Each of these email images represents content of an email; specifically, character strings representing an email address from which the email is transferred, a subject of the email, and a beginning part of a body of the email. For example, email image 331 represents character strings "From: aaaa@aa.co.jp," "Subject: Hello," and "Body: Hello, . . . ". Viewing these character strings allows a user to recognize content of the email. Of these email images, email image 331 represents content of the last received (newest) email, and email image 335 represents content of the first received (oldest) email. These email images are displayed in chronological order of receipt; specifically, in such an order that an email image representing a newer email is displayed at an upper position and an email image representing an older email is displayed at a lower position (namely, descending chronological order).

When a user performs an operation to indicate list image 330, display device 1 executes an operation other than the foregoing acquiring operation of a newly arrived email (hereinafter, referred to as a "list image operation") according to the user's input operation.

The email images included in list image 330 represent some emails from among a plurality of emails stored in display device 1. When a user performs an operation to touch an email image, display device 1 executes an operation to display an image representing details of an email represented by the email image (a detailed image of an email) (this operation is referred to as a detailed display). The touch operation referred to here is an operation without shifting an indicated position, unlike a drag operation. The detailed display is included in the list image operation. Display device 1 switches a displayed image from the list image to the detailed image of an email when executing the detailed display.

When the list image is dragged in the upward direction and display device 1 stores emails received prior to emails represented by email images included in the list image, display device 1 executes an operation for displaying email images that represent content of the emails. On the other hand, when the list image is dragged in the downward direction and display device 1 stores emails received after emails represented by email images included in the list image, display device 1 executes an operation for displaying email images that represent content of the emails. That is, when the list image is dragged and there is an email image to be displayed, display device 1 executes an operation for moving the list image to display email images one after another (this is referred to as a scrolling display). The scrolling display is included in the list image operation. When executing the scrolling display, display device 1 moves an email image displayed at a position that a user initially indicates, according to an indicated position being shifted. When a user terminates an indication (a drag operation), display device 1 terminates a movement of the email images. It is to be noted that after the drag operation is terminated, display device 1 may terminate a movement of the email images after continuing to move the email images, for example, for a distance corresponding to a speed of the drag operation when the drag operation is terminated.

Display device 1, however, does not execute the scrolling display when there is no email image to be displayed even if the list image is dragged. For example, when the list image is dragged in the downward direction when the latest email image is already displayed, display device 1 does not execute the scrolling display because no email received after the latest email is stored. In this case, display device 1 continues to display an email image displayed at an indicated position without changing a displayed position. The foregoing list image operation is executed by a cooperation of control unit 10, touch screen unit 20, and storage unit 51 shown in FIG. 1.

A processing executed during a period of time from when a user performs a user's input operation to execute the specific operation to when display device 1 executes the specific operation upon receiving the user's input operation, is described below. In the following description, this processing is referred to as an "operation-startup processing."

Figure 4:
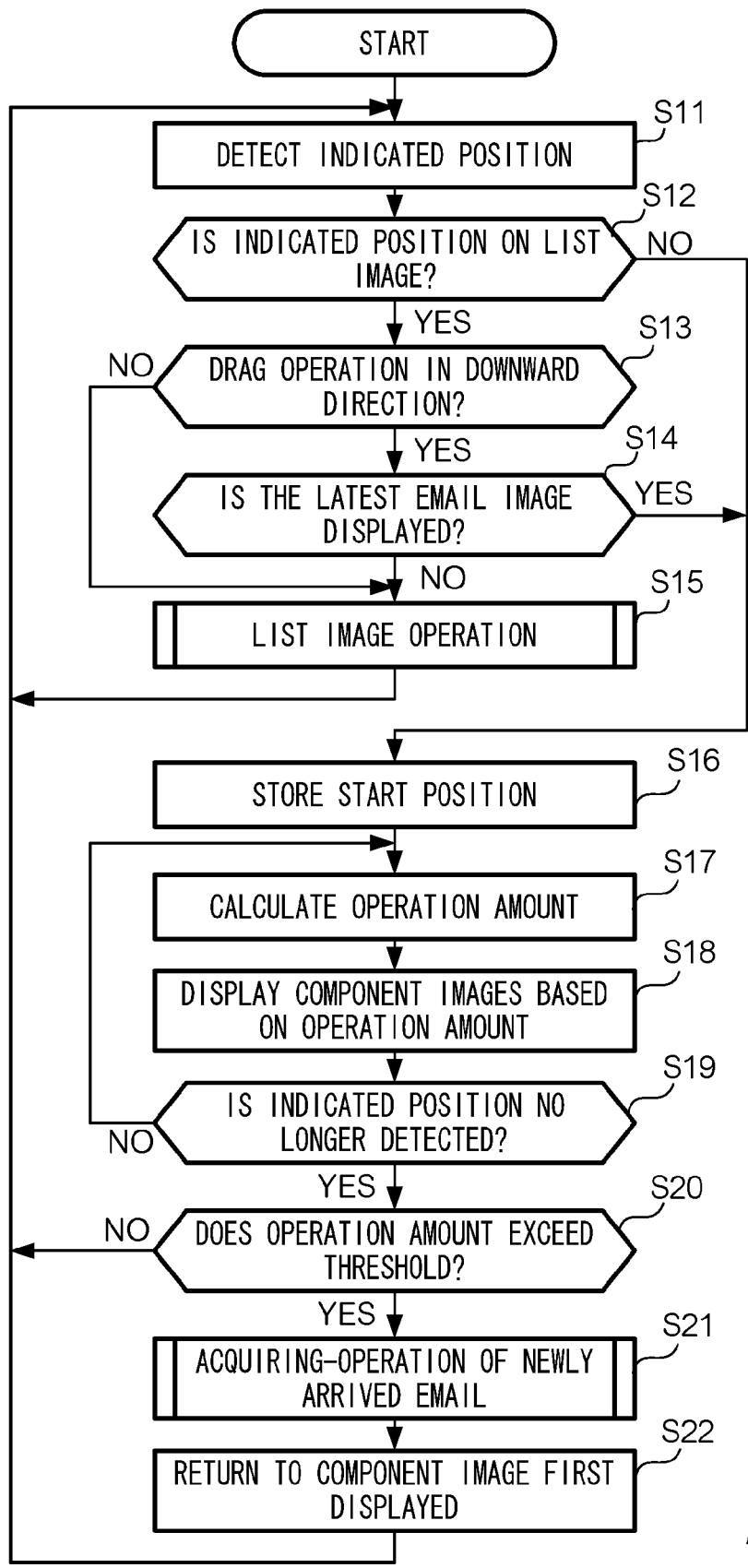
FIG. 4 is a flow chart illustrating an example of operating procedures in an operation-startup processing.

FIG. 4 is a flow chart illustrating an example of operating procedures that display device 1 executes in the operation-startup processing. FIG. 4 illustrates an example in a case where display device 1 is operated to execute the foregoing acquiring operation of a newly arrived email. Display device 1 starts the operation-startup processing shown in FIG. 4 when a user indicates a position on display surface 31 while, for example, list image 330 shown in FIG. 3 is displayed.

Firstly, when a user indicates a position on display surface 31, display device 1 detects the indicated position (step S11). This operation of step S11 is executed by detecting unit 102 shown in FIG. 2. Display device 1 subsequently determines whether the indicated position detected at step S11 is on list image 330 (step S12). Specifically, display device 1 stores in storage unit 51 coordinates representing a quadrilateral area at which displayed list image 330 is displayed (for example, a left-upper coordinate and right-lower coordinate of list image 330). If the quadrilateral area represented by the coordinates includes a coordinate of the indicated position, display device 1 determines that the detected indicated position is on list image 330 (namely, "YES"). When determining "YES" at step S12, display device 1 determines whether an operation performed by a user is a drag operation in the downward direction (step S13). Specifically, after detecting the indicated position, when the indicated position is shifted for a distance greater than or equal to a determined distance (for example, 1 mm) and a direction in which the indicated position is shifted is in line with the downward direction, display device 1 determines that the operation is the drag operation in the downward direction (namely, "YES"). When making this determination, even if the direction in which the indicated position is shifted is offset from the downward direction in some degree without being completely in line with the downward direction, display device 1 determines that the two directions are in line with each other as long as an offset angle falls within a predetermined angle range (for example, 10 degrees).

When determining "YES" at step S13, display device 1 determines whether the latest email image is displayed on display surface 31 (step S14). The latest email image referred to here is an email image representing the latest email among emails that display device 1 has already received and stored in storage unit 51. An email image of an email that the mail server receives and stores, but display device 1 has not received yet is not displayed. Hence, the latest email image does not include this email image. When determining that the latest email image is not displayed (step S14: NO), display device 1 executes the foregoing list image operation (step S15). When determining "NO" at step S13, display device 1 also executes this operation of step S15 (namely, the list image operation). In this example, when determining "YES" at step S13 (the user's input operation is the drag operation), display device 1 executes the foregoing scrolling display. Meanwhile, determining "NO" at step S13 (the operation is not the drag operation in the downward direction), display device 1 executes the foregoing detailed display or scrolling display, or executes no operation because this means that a touch operation or drag operation in a direction other than the downward direction is performed. After executing the list image operation, display device 1 returns again to step S11 to repeat operations.

When determining at step S12 that the indicated position is not on list image 330 (namely, "NO"), or determining at step S14 that the latest email image is displayed (namely, "YES"), display device 1 stores the indicated position initially detected at step S11 as data representing a start position (step S16). The data representing a start position specifically refers to a coordinate value representing a position on display surface 31. After that, display device 1 calculates the foregoing operation amount when the indicated position is shifted (step S17).

Figure 5:
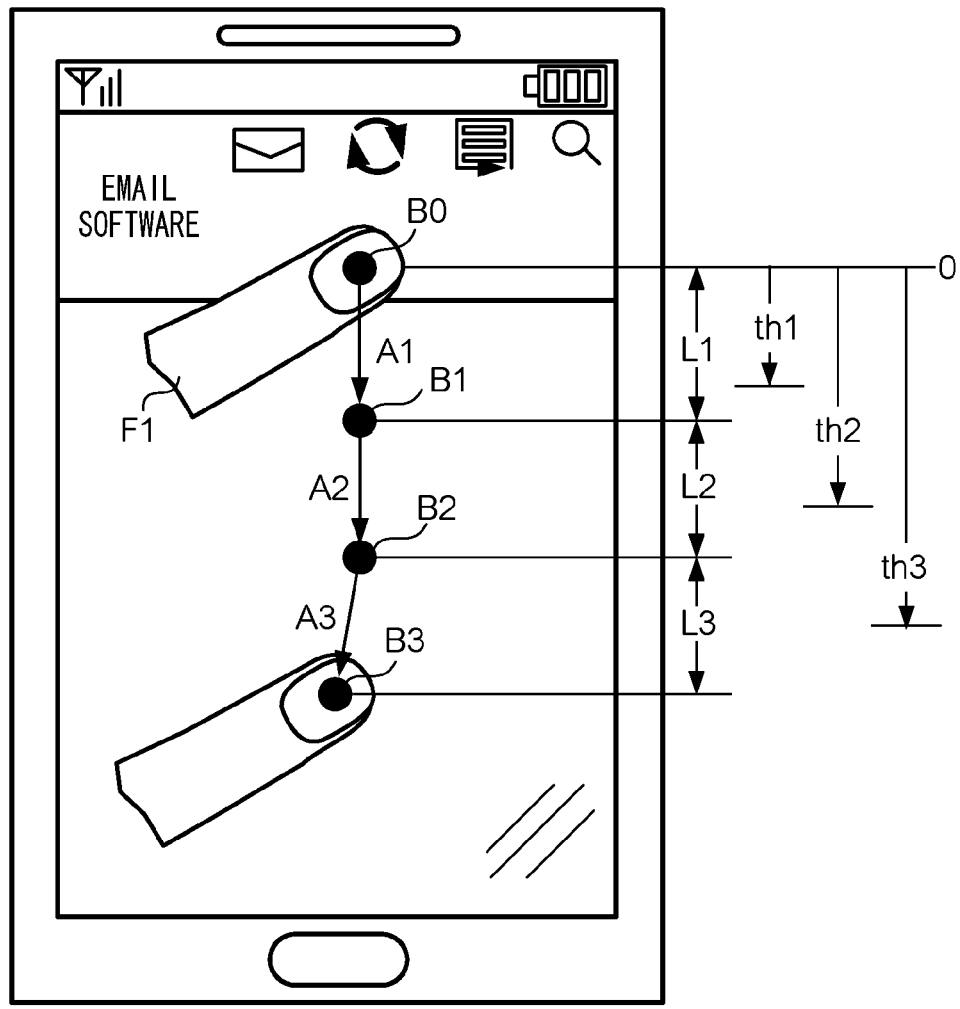
FIG. 5 is a diagram for explaining an operation for calculating an operation amount.
Figures 6A, 6B, 6C, 6D:
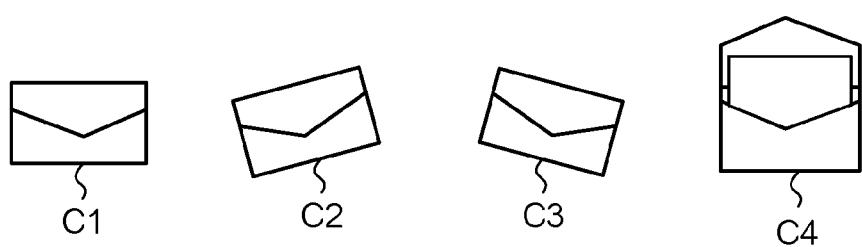
FIGS. 6A to 6D are diagrams illustrating an example of a plurality of component images.

FIG. 5 is a diagram for explaining an operation for calculating the operation amount. In FIG. 5, display surface 31 is illustrated in a manner similar to FIG. 3; however, illustration of list image 300 is omitted to facilitate visualization. FIG. 5 illustrates an example in which a user uses finger F1 to indicate a position on display surface 31. In this example, a user initially indicates start position B0 using finger F1. Then, the user shifts the indicated position by moving finger F1 on the display surface. As a result, shifted positions B1, B2, and B3 are indicated. Each of the shifted positions represents an indicated position that is shifted as described above. FIG. 5 also illustrates arrow A1 connecting start position B0 and shifted position B1, arrow A2 connecting shifted positions B1 and B2, and arrow A3 connecting shifted positions B2 and B3. Each of the arrows represents a direction and magnitude of the drag operation performed by a user; namely, a vector. In the following description, the vector is referred to as an "operation vector," and a direction represented by the operation vector is referred to as an "operation direction."

Display device 1 calculates, as an operation amount, a distance of a drag operation (an operation distance) when a corresponding operation direction is in line with the downward direction. The operation distance referred to here is a distance along the downward direction between the indicated positions sequentially detected in series. In FIG. 5, the operation distance is represented by a vector component in the up and down directions of an operation vector. L1 is an operation distance between start position B0 and shifted position B1. L2 is an operation distance between shifted positions B1 and B2. L3 is an operation distance between shifted positions B2 and B3.

As step S13, even if the operation direction is offset from the downward direction in some degree without being completely in line with the downward direction, display device 1 determines that the two directions are in line with each other as long as an offset angle falls within a determined angle range (for example, 10 degrees). For example, in FIG. 5 an operation direction represented by arrow A3 is offset from the downward direction to the left direction, but an offset angle falls into the foregoing range. In this case, display device 1 determines that all operation directions represented by arrows A1, A2, and A3 are in line with the downward direction, and calculates the sum of the operation distances (L1+L2+L3) as an operation amount. Thus, display device 1 calculates, as an operation amount, a distance from a start position to a shifted position along a predetermined direction (in this example, the downward direction).

Display device 1 executes this calculation of an operation amount every time an indicated position is detected (in the present embodiment, every 0.1 second). Meanwhile, when determining that an angle between the operation direction and downward direction falls outside of the foregoing range, display device 1 prevents from adding a subsequent operation distance to an operation amount. These operations of steps S12, S13, S14, S16 and S17 are executed by calculating unit 103 shown in FIG. 2.

Display device 1 subsequently displays component images on display surface 31 based on the operation amount calculated at step S17 (step S18). This operation of step S18 is executed by moving-image-control unit 104 shown in FIG. 2. As described in an explanation for moving-image-control unit 104, the component images refer to a plurality of images that constitute a moving image by being displayed in a display order. The component images are described with reference to FIGS. 6A to 6D.

FIGS. 6A to 6D are diagrams illustrating an example of the plurality of component images. In FIGS. 6A, 6B, 6C, and 6D, component images C1, C2, C3, and C4 are illustrated, respectively. Component image C1 is an image representing a sealed oblong envelope. Each of component images C2 and C3 is an image that is generated by varying an orientation of the envelope represented by component image C1. Component image C4 is an image representing an envelope of image C1 shown as opened. By displaying the component images in a display order (specifically, an increasing order of numbers, each number being placed at the end of a corresponding reference numeral), a moving image appears in which the envelope is opened after being displayed in a swinging motion.

Figure 7:
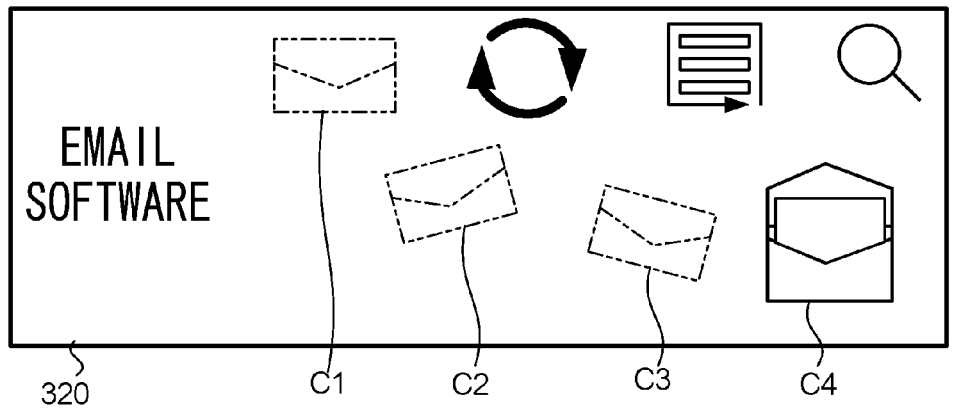
FIG. 7 is a diagram illustrating an example of a plurality of component images displayed on a display surface.

FIG. 7 is a diagram illustrating an example of the plurality of component images displayed on display surface 31. Display device 1 displays the component images shown in FIGS. 6A to 6D on email software image 320. In FIG. 7, component image C4 currently being displayed is illustrated. Each of component images C1 to C3 that are displayed before component image C4 is illustrated by a dashed double-dotted line. As shown in FIG. 3, component image C1 is an image already displayed when an email list is displayed at step S11. In other words, display device 1 has displayed a component image since before detecting an indicated position. In this example, it is assumed that a user performs operations shown in FIG. 5. When a user's input operations represented by arrows A1, A2, and A3 are performed, display device 1 respectively calculates, as operation amounts, operation distances L1, L1+L2, and L1+L2+L3 each time a user's input operation is performed.

Display device 1 displays component images in the foregoing display order while switching the component images based on the calculated operation amount. Returning to FIG. 5, this displaying operation is described. Display device 1 stores in advance thresholds th1, th2, and th3, each representing a length. Threshold th2 has a length double that of threshold th1. Threshold 3 has a length triple that of threshold th1. In other words, the thresholds have a relationship in length of th1<th2<th3. When the operation amount calculated at step S17 is smaller than or equal to threshold th1, display device 1 displays component image C1. When the operation amount exceeds threshold th1 and is also smaller than or equal to threshold th2, display device 1 displays component image C2. When the operation amount exceeds threshold th2 and is also smaller than or equal to threshold th3, display device 1 displays component image C3. When the operation amount exceeds threshold th3, display device 1 displays component image C4.

For the purpose of explaining a concept of the thresholds in a way easy to understand, FIG. 5 illustrates positions apart from start position B0 for the lengths of thresholds th1, th2, and th3 in the downward direction, which is along the up and down directions on display surface 31. These positions are arranged at equal intervals in the up and down directions. As shown in FIG. 5, when shifted position B1 is detected, since operation amount L1 exceeds threshold th1 and is also smaller than or equal to threshold th2, display device 1 displays component image C2 by switching from component image C1. When shifted position B2 is detected, since operation amount L1+L2 exceeds threshold th2 and is also smaller than or equal to threshold 3, display device 1 displays component image C3 by switching from component image 2. When shifted position B3 is detected, since operation amount L1+L2+L3 exceeds threshold th3, display device 1 displays component image C4 by switching from component image C3. Thus, display device 1 displays a moving image as shown in FIG. 7, in which an envelope appears as opened after being displayed in a swinging motion, while switching component images. It is to be noted that if the calculated operation amount is smaller than or equal to a threshold, display device 1 maintains display of a component image that is already displayed without switching. In any event, display device 1 displays component images based on the calculated operation amount.

Display device 1 subsequently determines whether the indicated position is no longer detected (step S19). Specifically, display device 1 determines that the indicated position is no longer detected (YES) when the detected position has not been detected for a predetermined time (for example, 0.3 seconds). When determining "NO" (step S19: NO), display device 1 executes an operation of step S17. In other words, display device 1 repeats the operations of steps S17, S18, and S19 to display the component images based on an operation amount until the indicated position is no longer detected.

Meanwhile, when the indicated position is no longer detected (step S19: YES), display device 1 determines whether the calculated operation amount exceeds threshold th3 (step S20). When determining that the calculated operation amount does not exceed threshold th3 (step S20: NO), display device 1 returns to step S11 to repeat operations. Meanwhile, when determining that the operation amount exceeds threshold th3 (step S20: YES), display device 1 executes the foregoing acquiring operation of a newly arrived email (step S21). These operations of steps S19, S20, and S21 are executed by executing unit 105 shown in FIG. 2. When the acquiring operation of a newly arrived email is terminated, display device 1 returns to displaying a component image first displayed in the foregoing display order (namely, component image C1) (step S22). This operation of step S22 is executed by moving-image-control unit 104 shown in FIG. 2.

Figure 8:
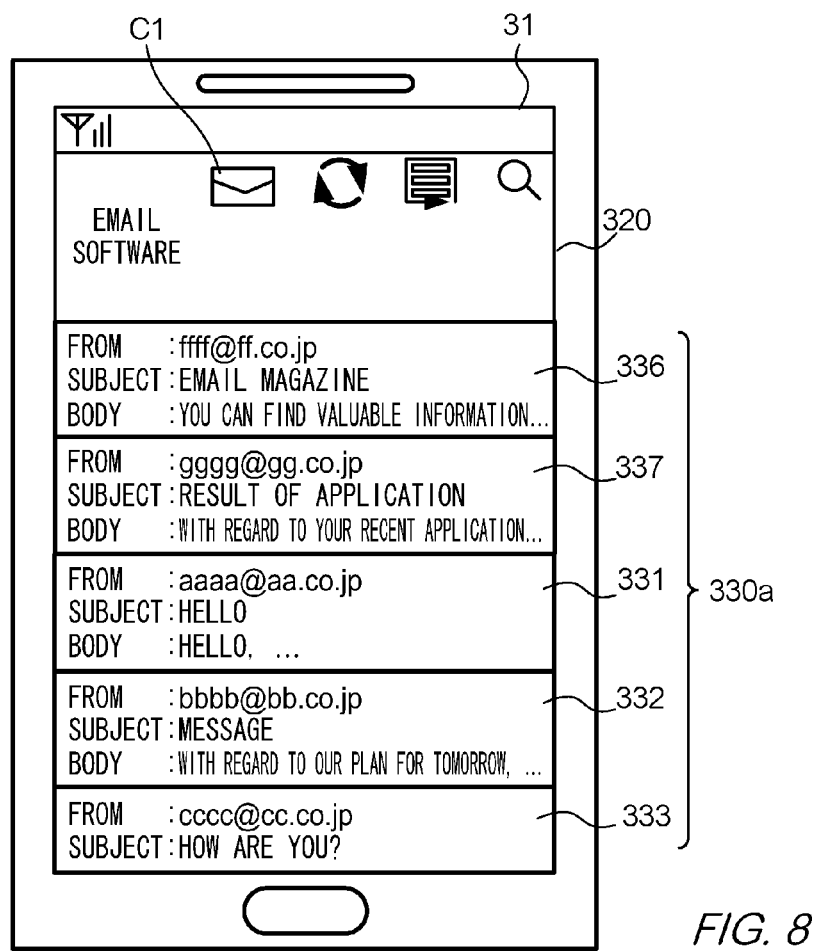
FIG. 8 is a diagram illustrating an example of an image displayed as a result of execution of a specific operation.

FIG. 8 is a diagram illustrating an example of an image displayed as a result of execution of the acquiring operation of a newly arrived email. In FIG. 8, list image 330a including five email images 331, 332, 333, 336, and 337 is displayed on display surface 31. Each of email images 336 and 337 is an image representing content of a newly arrived email that display device 1 acquires from the mail server in the acquiring operation of a newly arrived email. Thus, an email image representing an acquired newly arrived email (in this example, email images 336 and 337) is newly displayed on display surface 31, and an email image that is already displayed moves in the downward direction (in this example, email images 331, 332, and 333) or is hidden (email images 334 and 335 shown in FIG. 3). In addition, email software image 320 includes component image C1. That is, email software image 320 returns to a state shown in FIG. 3, which is before the acquiring operation of a newly arrived email is executed.

As described above, display device 1 executes either the specific operation (the acquiring operation of a newly arrived email) or the list image operation by executing the operation-startup processing. Among operations shown in FIG. 4, operations other than the operations of steps S15 and S21 represent the operation-startup processing. In the list image operation at step S15, when a user shifts an indicated position, display device 1 moves (scrolls) an image displayed at the position indicated by the user, or switches the image accordingly. In the acquiring operation of a newly arrived email at step S21, when a newly arrived email is acquired, display device 1 newly displays an email image representing the acquired newly arrived email, and also moves in the downward direction an email image that has been displayed until then. Meanwhile, display device 1 is prevented from executing scrolling or switching of an image as described above during the operation-startup processing. In other words, during the operation-startup processing, display device 1 maintains display of an image that is displayed at a position that a user initially indicates (namely, the start position) without varying the position and content of the image. Accordingly, the only moving image, which is shown in FIG. 7, moves on display surface 31 during the operation-startup processing. Therefore, it is prevented that an image other than this moving image moves, and this movement catches a user's attention while a user performs a user's input operation to start the specific operation.

In the present embodiment, display device 1 displays a moving image as shown in FIG. 7 before executing the specific operation (the acquiring operation of a newly arrived email) that a user intends to execute. Therefore, it is possible that display device 1 notifies a user that a user's input operation is received before an operation according to that user's input operation is executed. In addition, when a user performs a touch operation to list image 330, display device 1 prevents the operation-startup processing from proceeding by executing operations of steps S12 and S13 to execute a detailed display. When a user performs a drag operation to list image 330 while the last email image is not displayed, display device 1 prevents the operation-startup processing from proceeding by executing operations of steps S12 and S14 to execute a scrolling display. In these cases, display device 1 neither displays a moving image nor receives a user's input operation to start the specific operation (the acquiring operation of a newly arrived email). If the operation-startup processing is executed even while a list image operation is executed, it is a possible occurrence that the operation-startup processing is executed despite a user's intention while the user performs an operation to look for a user's intended email by, for example, scrolling a list image. According to the present embodiment, it is possible to reduce such a possibility that the operation-startup processing is executed despite a user's intention, or when a user does not so desire.

As shown in FIG. 8, display device 1 returns to displaying a component image first displayed (component image C1) after the specific operation is terminated. Accordingly, in the present embodiment, a user can understand that the specific operation is still running while component image C4 is displayed, and also can understand that the specific operation is terminated when component image C1 is displayed. Therefore, a user can understand whether the specific operation is terminated by viewing a moving image, instead of a list image.

As shown in FIGS. 5 and 7, when an operation distance, namely, an operation amount, is smaller than or equal to threshold th3 shown in FIG. 5, display device 1 displays component images, such as component images C1, C2, and C3, each of which is generated by varying only an "orientation" of an image without varying a shape of the image. Meanwhile, when an operation amount exceeds threshold th3, display device 1 displays component image C4 that is generated by varying a "shape" based on a component image that has been displayed until then. Accordingly, a moving image displayed by display device 1 has a first variation for an "orientation" and a second variation for a "shape." This allows a user easily to understand a timing when the first variation is switched to the second variation, compared with a case where, for example, a moving image continues to vary only in "orientation." In addition, if a user learns that terminating an instruction at this timing causes the specific operation to be executed, a user can instruct execution of the specific operation without fail, compared with the foregoing case where a moving image continues to vary only in "orientation." In other words, it is prevented that an instruction is terminated at such a timing that the specific operation is not executed.

As shown in FIGS. 3 and 5, display device 1 executes addition of an operation amount when a drag operation is performed in the downward direction in which email images are arranged. It is easy for a user to understand a direction in which the email images are arranged by viewing the email images. In addition, the email images are images to be a subject of an operation that a user intends to execute (the acquiring operation of a newly arrived email). Thus, by using a direction that is easily understood from an image to be a subject of an operation as an operation direction of a user's input operation to execute the operation, display device 1 allows a user easily to perform this user's input operation, compared with a case where the two directions differ from each other.

[Modifications]

The foregoing embodiment is merely an exemplary embodiment of the present invention. The foregoing embodiment may be modified as described below. In addition, the foregoing embodiment and each of the following embodiments may be combined with each other.

(Modification 1)

In the foregoing embodiment, display device 1 displays a moving image whose content is an envelope that is opened, at step S18 shown in FIG. 4. Display device 1 may, however, display not only this moving image, but also a moving image having another content.

Figure 9A:
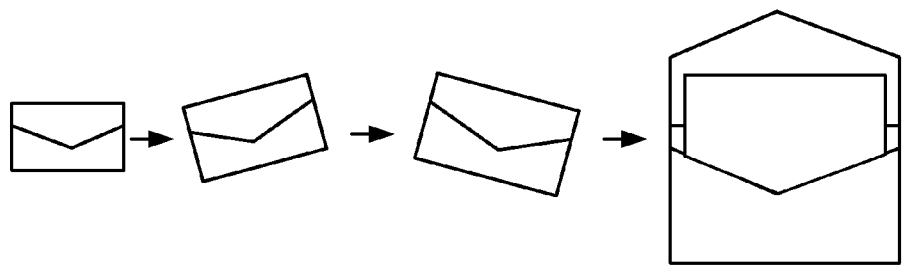
FIGS. 9A to 9C are diagrams each illustrating an example of a moving image according to a modification.
Figure 9B:
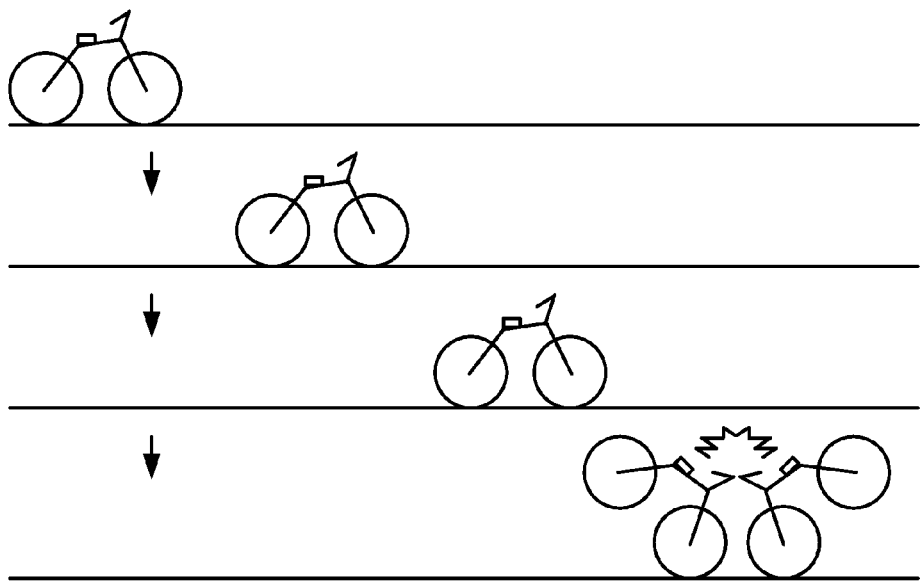
Figure 9C:
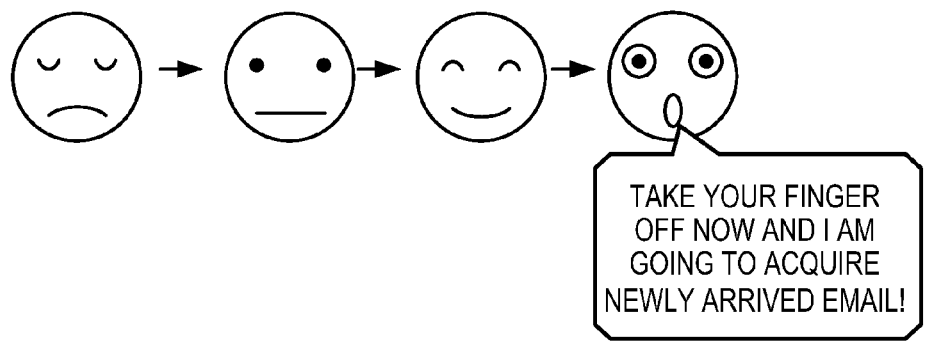

FIGS. 9A to 9C are diagrams each illustrating an example of a moving image according to the present modification. For example, display device 1 may vary only a color or size of an envelope without varying a shape of the envelope, or may vary a combination of at least two of a shape, color, and size. FIG. 9A illustrates an example that the envelope that is opened in the moving image shown in FIG. 6A also varies in size. In another embodiment, display device 1 may display a moving image in which an animal or a vehicle moves, or a moving image in which a character moves.

In another embodiment, display device 1 may display a moving image in which an item newly appears in the middle of the moving image. FIG. 9B illustrates a moving image in which a moving bicycle bumps into another bicycle that appears later. In another embodiment, display device 1 may incorporate a character into a moving image. FIG. 9C illustrates a moving image in which a countenance of a character varies based on an operation amount, and then the displayed character speaks a line "Take your finger off now and I am going to acquire a newly arrived email!" in a balloon when the operation amount exceeds threshold th3 shown in FIG. 5. Although in any of the foregoing examples, a moving image in which an item represented by an image (an envelope or a bicycle) moves is illustrated, a moving image may include an unmoving item. For example, display device 1 may display a moving image in which a position of the envelope shown in FIG. 9A is fixed. In this case, varying a size and shape of the envelope allows a user to recognize that an image varies. As described above, display device 1 may display a moving image having any content as long as the moving image allows a user to recognize that an image varies. This enables display device 1 to notify a user that a user's input operation to execute the specific operation is received.

In any of these cases, display device 1 may cause content of a moving image to have a variation different from a previous variation during a period of time just before and after an operation amount exceeds threshold th3, as the another component images described in the embodiment. Specifically, display device 1 stores a plurality of first component images and a second component image. When the first component images are displayed, a content of a moving image has a first variation. When the second component image is displayed subsequent to the plurality of the first component images, the content of the moving image has a second variation, which is different from the first variation. That is, component images include a plurality of first component images and a second component image in the present modification. For example, in the example shown in FIGS. 6A to 6D, component images C1 to C3 correspond to the plurality of first component images, and component image C4 corresponds to the second component image. Then, display device 1 displays the plurality of first component images while switching the plurality of first component images in a display order until a calculated operation amount reaches threshold th3, and displays the second component image by switching from the last of the plurality of first component images when the calculated operation amount exceeds threshold th3.

The first and second variations referred to here are not limited to variations that differ from each other in subjects of the variations, such as an "orientation" and a "shape" described in the embodiment. For example, the first and second variations differ from each other in a degree of variation such that an "orientation" varies by 5 degrees in the first variation, and the "orientation" varies by 90 degrees in the second variation. For example, in the example shown in FIG. 9A, an envelope increases in size gradually in the first variation, and the envelope increases in size extensively in the second variation, which is provided when the envelope is opened. In another example, as shown in FIG. 9B, an appearance of an item that is hidden until now (in this example, another bicycle) may be used as the second variation. In another example, as shown in FIG. 9C, a newly appearing item (in this example, a line in a balloon) may specifically represent what operation causes an implementation of what process. In any of these cases, the first and second variations may be any variations as long as the first and second variations allow a user to understand a timing when the first variation is switched to the second variation. This allows a user to instruct execution of the specific operation without fail.

(Modification 2)

In the foregoing embodiment or modification, display device 1 displays, as a moving image, one series of pictures varying gradually (a so-called animation). Display device 1 may, however, display a moving image being constituted of images other than these pictures. For example, display device 1 may display a moving image edited from images photographed by a video camera or images photographed by a digital camera (a so-called photographic image) such that the photographed images appear to move. In another embodiment, display device 1 may display a moving image including both an animation and a photographic image. In summary, display device 1 may display any moving image as long as the moving image allows a user to recognize that an image varies.

(Modification 3)

At step S18 shown in FIG. 4, display device 1 switches component images based on a relation between an operation amount and thresholds th1, th2, and th3; however, the present invention is not limited to this example. For example, display device 1 may increase a number of thresholds and a number of component images to display a moving image that appears to move more smoothly. In another embodiment, although in the embodiment thresholds are set such that when the thresholds are arranged in a decreasing order, each set of successive thresholds has an equal difference, the thresholds may be set such that, for example, a set of greater thresholds has a greater difference, or conversely, a set of greater thresholds has a smaller difference. This enables display device 1 to display a moving image in which an item moves at a speed that gradually increases, or a moving image in which an item moves at a speed that gradually decreases. In another embodiment, display device 1 may vary the differences regardless of magnitude of thresholds, or may vary the differences randomly. In any of these cases, display device 1 basically displays component images based on an operation amount.

(Modification 4)

At step S17 shown in FIG. 4, display device 1 may calculate an operation amount in a method different from a method described in the foregoing embodiment. For example, although in the embodiment, display device 1 determines whether an operation direction of an operation vector shown in FIG. 5 is in line with the downward direction, display device 1 may determine whether the operation direction is in line with another direction. For example, depending on email software to be executed, a list image may include email images arranged in the left and right directions, not the up and down directions.

Figure 10:
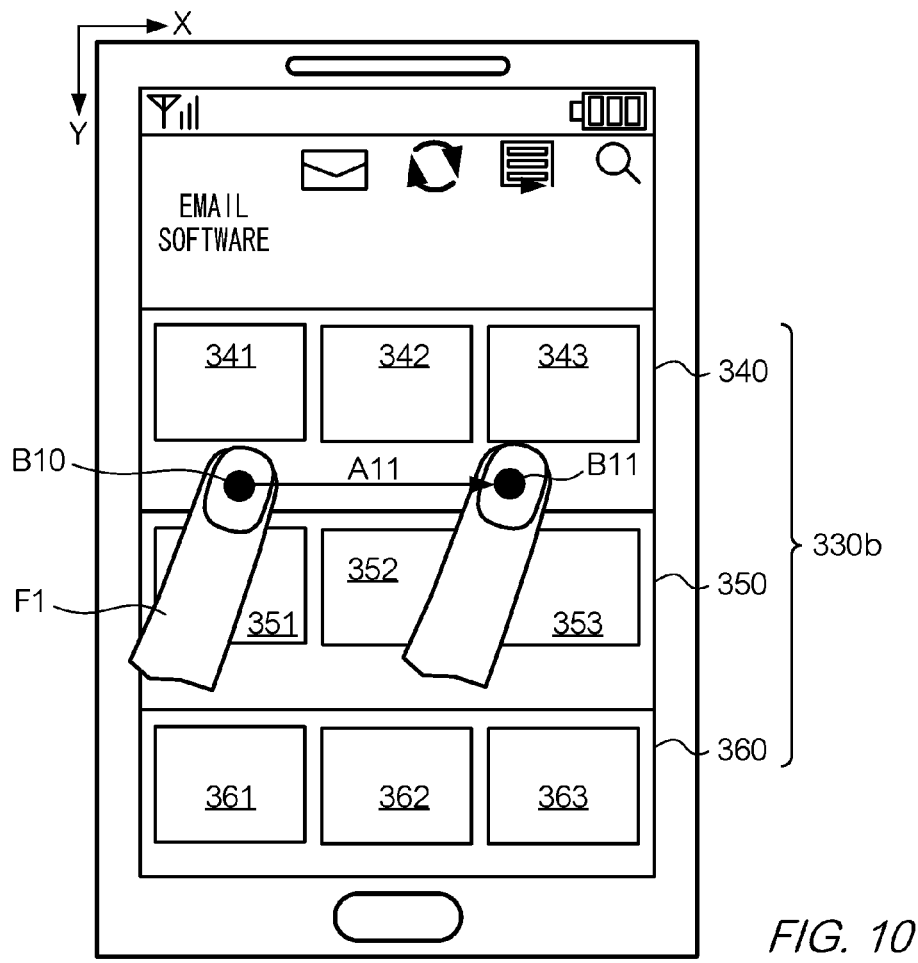
FIG. 10 is a diagram illustrating an example of a list image displayed according to a modification.

FIG. 10 is a diagram illustrating an example of a list image displayed according to the present modification. FIG. 10 illustrates list image 330b including group images 340, 350, and 360. Group image 340 includes email images 341, 342, and 343. Group image 350 includes email images 351, 352, and 353. Group image 360 includes email images 361, 362, and 363. Each of the group images represents a group of emails including the same feature. Of these email images, email images placed leftward represent newer emails. In addition, display device 1 may execute the acquiring operation of a newly arrived email on an email including the same feature as that of emails in these groups.

In this example, display device 1 determines whether an operation direction is in line with the right direction (a direction indicated by arrow X). For example, as shown in FIG. 10, a user shifts a position indicated by finger F1 in the right direction in an area in which group image 340 is displayed. In this case, display device 1 detects start position B10 and shifted position B11. Display device 1 determines whether an operation direction of operation vector A11 that connects start position B10 and shifted position B11 is in line with the right direction. If the two directions are in line with each other, display device 1 calculates, as an operation amount, an operation distance of operation vector A11. That is, display device 1 may determine that an operation direction is in line with a predetermined direction, which is not limited to the downward direction.

In another embodiment, as the example shown in FIG. 10, when displaying an image representing an item of information among a plurality of items of information, display device 1 may execute, as the specific operation, an acquiring operation of information other than the item of information among the plurality of items of information. In this case, display device 1 may determine that an operation direction of the operation vector shown in FIG. 5 is in line with a direction in which the item of information is arranged. This allows a user to execute the operation-startup processing by the same user's input operation as a user's input operation to scroll a list image. In addition, even if a user is ignorant of a method of a user's input operation to execute the operation-startup processing, this enables a user to find this method easier than another operation method. It is to be noted that the list image does not have to be an image that is scrolled as described above as long as the list image is basically an image in which a plurality of items of information are arranged. As described above, a displaying operation of a list image is executed by a cooperation of control unit 10, display unit 30, storage unit 51, and communication unit 54 shown in FIG. 1.
(Modification 5)

In the embodiment, when determining that an angle between an operation direction of the operation vector shown in FIG. 5 and the downward direction falls outside of a predetermined range, in other words, an offset angle of an operation direction falls outside of an acceptable range, display device 1 prevents from adding a subsequent operation distance (a magnitude of the operation vector in the downward direction) to an operation amount, at step S17 shown in FIG. 4. However, the present invention is not limited to this example. Even once an offset angle of an operation direction falls outside of an acceptable range, display device 1 may add an operation distance of an operation vector to an operation amount when such a shifted position that the offset angle falls within the acceptable range is detected.

In display device 1, the foregoing range used for determining an offset of a direction does not have to be provided. In this case, display device 1 adds an operation distance of an operation vector to an operation amount only if, for example, an operation direction is completely in line with the downward direction. Alternatively, display device 1 adds an operation distance of an operation vector as an operation amount regardless of an operation direction. In this case, even if the operation direction is offset to the left and right directions by any angle of offset, a user can instruct execution of the specific operation when magnitude of a user's input operation to shift an indicated position in the downward direction exceeds threshold th3 shown in FIG. 5. In summary, in display device 1, an acceptable range may de determined or no acceptable range is provided depending on an acceptable degree of offset of an operation direction.

In another embodiment, display device 1 may execute the foregoing determination using an operation vector that directly connects from a start position to the last shifted position, instead of using an operation vector that connects successive shifted positions as shown in FIG. 5. In this case, display device 1 stores only data representing a start position. Therefore, it is possible to reduce an amount of stored date compared with a case of using an operation vector that connects successive shifted positions.

In another embodiment, display device 1 may calculate, as an operation amount, a sum of magnitude of operation vectors, instead of the foregoing operation distance. For example, display device 1 may add magnitude of an operation vector, instead of the operation distance, when determining whether to execute an addition to an operation amount depending on whether an operation direction is in line with a predetermined direction as described in the embodiment. In another example, when a path of a series of detected indicated positions forms a determined shape, display device 1 may add to an operation amount magnitude of an operation vector of a user's input operation to shift the indicated positions. In another embodiment, display device 1 may simply calculate, as an operation amount, a distance that an indicated position is shifted (a distance that an indicated position is shifted from a start position to a shifted position along a shifted path) regardless of the path of a series of indicated positions.
(Modification 6)

At step S17 shown in FIG. 4, display device 1 may reduce a calculated operation amount when detecting a position shifted in an opposite direction of a determined direction.

Figure 11A:
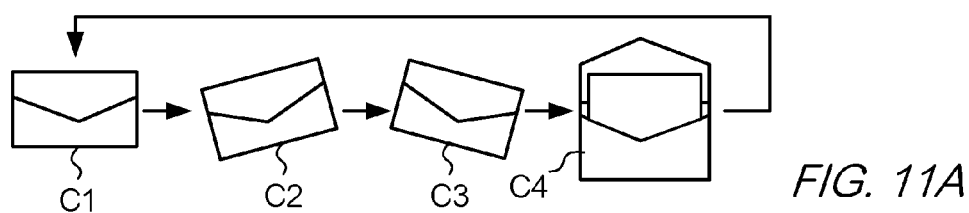
FIGS. 11A to 11B are diagrams illustrating a transition of component images displayed according to a modification.
Figure 11B:
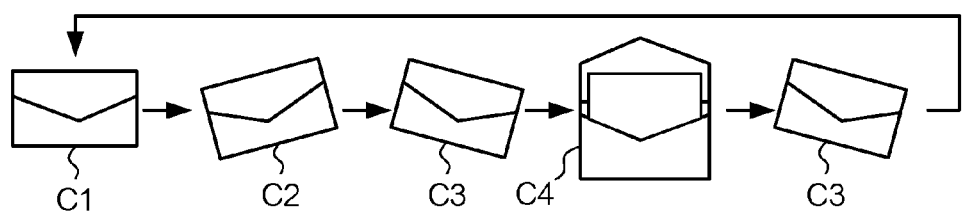

FIGS. 11A and 11B are diagrams illustrating a transition of component images displayed according to the present modification. FIG. 11A illustrates a transition of component images C1, C2, C3, and C4 in a case where the component images are displayed in the foregoing display order while being switched. In this case, component image C1 is displayed subsequent to component image C4. FIG. 11B illustrates a transition of component images C1, C2, C3, and C4 in a case where component image C3 is displayed subsequent to component image C4. For example, in FIG. 5 this transition is executed when a user moves finger F1 to shifted position B3, and then returns finger F1 to shifted position B2.

In this example, display device 1 subtracts from an operation amount (in this case, L1+L2+L3) operation distance L3 of an operation vector that connects from shifted position B3 to shifted position B2. Therefore, the operation amount becomes L1+L2. Since this operation amount is smaller than threshold th3 shown in FIG. 5, display device 1 switches a displayed component image from component image C4 to component image C3. Thus, display device 1 displays a plurality of component images while switching the plurality of component images to a reverse order from a display order when a calculated operation amount reduces. Therefore, for example, when a user desires to cancel a specific operation after a user's input operation to display component image C4 is performed once, the user can cancel an execution of the specific operation by returning a shifted position in the upward direction. In addition, in this example, a displayed component image returns to component image C3. This allows a user to recognize that display device 1 prevents execution of the specific operation even if a user terminates instructions.

(Modification 7)

At steps S19, S20, and S21 shown in FIG. 4, display device 1 executes the acquiring operation of a newly arrived email when a position is no longer detected while a calculated operation amount exceeds a threshold. However, the present invention is not limited to this example. For example, display device 1 may execute the acquiring operation of a newly arrived email at a timing when a calculated operation amount exceeds a threshold.

Figure 12:
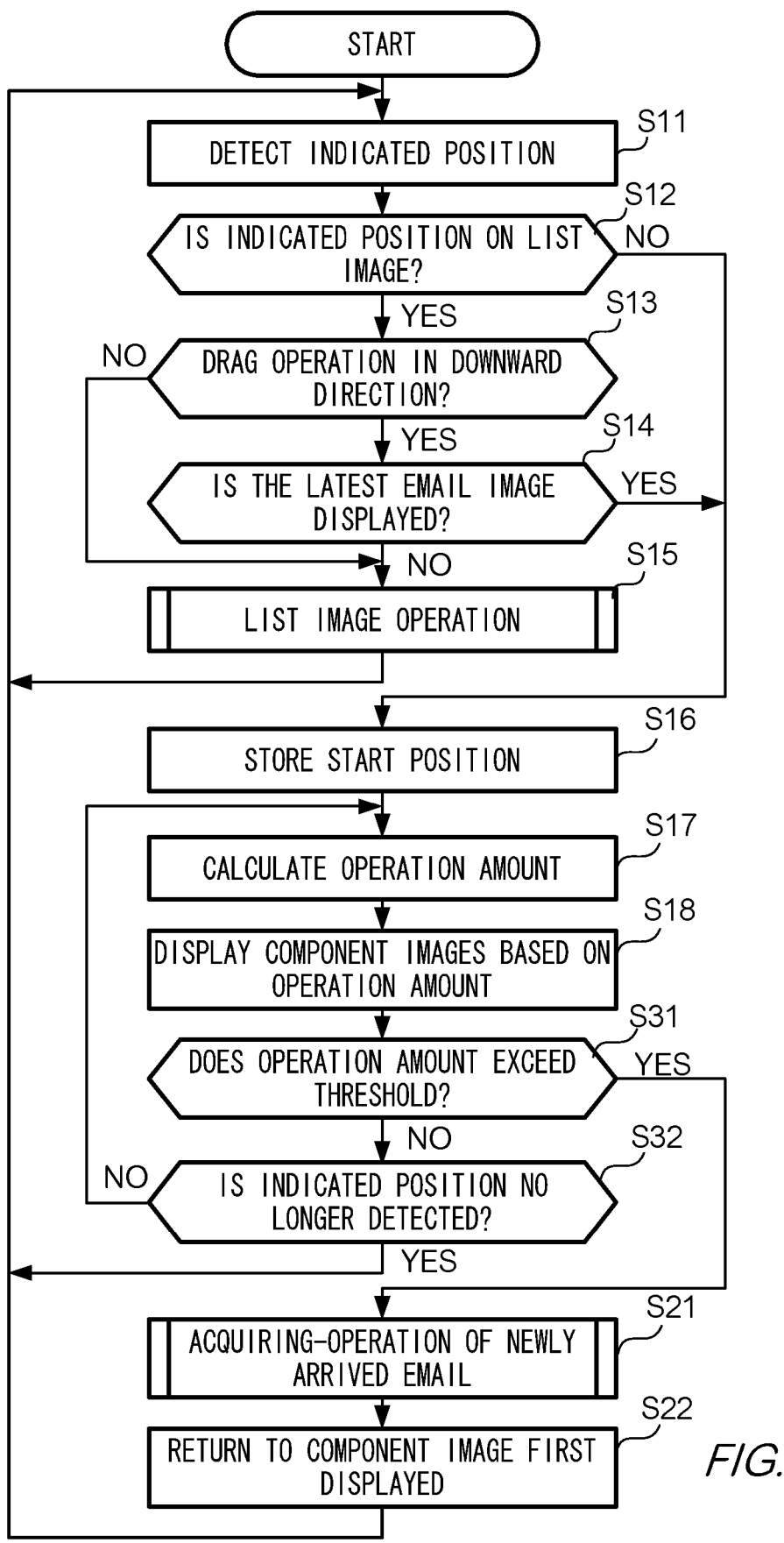
FIG. 12 is a flow chart illustrating an example of operating procedures in an operation-startup processing.

FIG. 12 is a flow chart illustrating an example of operating procedures that display device 1 executes in the operation-startup processing according to the present modification. Display device 1 executes operations to step S18 shown in FIG. 4, and then displays component images based on an operation amount. Display device 1 subsequently determines whether the operation amount exceeds a threshold (step S31). If it is determined that the operation amount exceeds the threshold (step S31: YES), display device 1 proceeds to step S21 to execute the acquiring operation of a newly arrived email. Meanwhile, if it is determined that the operation amount does not exceed the threshold (step S31: NO), display device 1 determines whether an indicated position is no longer detected (step S32). If it is determined that the indicated position is detected (step S32: NO), display device 1 returns to step S17 to calculate an operation amount again. Thus, display device 1 repeatedly executes calculation of an operation amount and display of component images based on the calculated operation amount until the operation amount exceeds the threshold, or the indicated position is no longer detected. Meanwhile, if it is determined at step S32 that the indicated position is no longer detected (YES), display device 1 returns to step S11 to repeat operations. These operations of steps 31 and S32 are executed by executing unit 105 shown in FIG. 2.

In the foregoing embodiment, the specific operation is executed when a user, who indicates a position on display surface 31 using a finger, takes the finger from display surface 31. On the other hand, according to the present modification, the specific operation (in this example, the acquiring operation of a newly arrived email) is executed without a user taking a finger from display surface 31. This enables a user to be provided with an operational feeling different from that of the embodiment.

In any of the foregoing embodiment, the present modification, and other modifications, display device 1 executes a specific operation in a case where an operation amount calculated at step S17 exceeds a threshold. This case where an operation amount exceeds a threshold referred to here is not only a moment at which an operation amount exceeds a threshold, but also any time during which an operation amount exceeds a threshold. Specifically, display device 1 executes the specific operation at a timing when an operation amount exceeds a threshold as described in the present modification, or at a timing when an indicated position is no longer detected as described in the embodiment, while the operation amount exceeds the threshold.

(Modification 8)

At steps S19 and S20 shown in FIG. 4, even if a detection of a shifted position is terminated while an operation amount exceeds threshold th3, display device 1 may prevent execution of the specific operation if another condition is satisfied. For example, display device 1 prevents execution of the specific operation when a period of time from when a start position is detected (when a shift of an indicated position is started) to when a shifted position is no longer detected, is smaller than or equal to a predetermined value. In a case where display device 1 is contained in a bag, it may occur that an indicated position is detected against a user's intention by an item contacting with display surface 31. Such a contact often occurs momentary. Therefore, setting the foregoing predetermined value to a time, for example, about 1 second, enables prevention of execution of the specific operation when an operation amount exceeds threshold th3 by a momentary contact during a time shorter than the set value.

In contrast, display device 1 prevents execution of the specific operation when a period of time from when a start position is detected to when a shifted position is no longer detected, is greater than or equal to a predetermined value (for example, 10 seconds). In this case, it never occurs that an indicated position is detected without a user's intention by an item continuously contacting with display surface 31. It is to be noted that if display device 1 is configured to prevent execution of the specific operation in each of a case where the foregoing time is smaller than or equal to a predetermined value (referred to as a first value), and a case where the foregoing time is greater than or equal to another predetermined value (referred to as a second value), the second value is set to a value greater than the first value. In addition, when the specific operation is executed when an operation amount exceeds a threshold as described in the foregoing modifications, display device 1 may prevent execution of the specific operation when a period of time from when a shift is started to when a calculated operation amount exceeds a threshold, is smaller than or equal to a first value and also is greater than or equal to a second value; otherwise, display device 1 executes the specific operation. In this case, display device 1 may also prevent execution of the specific operation only when the time is smaller than or equal to the first value, or may also prevent execution of the specific operation only when the time is greater than or equal to the second value. As described above, according to the present modification, it is possible to prevent execution of the specific operation by a contact against a user's intention.

(Modification 9)

In the foregoing embodiment and modifications, display device 1 calculates, as an operation amount, a distance that an indicated position is shifted (a distance between a start position and shifted position in a predetermined direction, or an actual shifted distance) based on a result of a detection at step S11 shown in FIG. 4. Display device 1 may, however, calculate not only an operation amount represented by the distance, but also an operation amount represented by, for example, a time.

Figure 13:
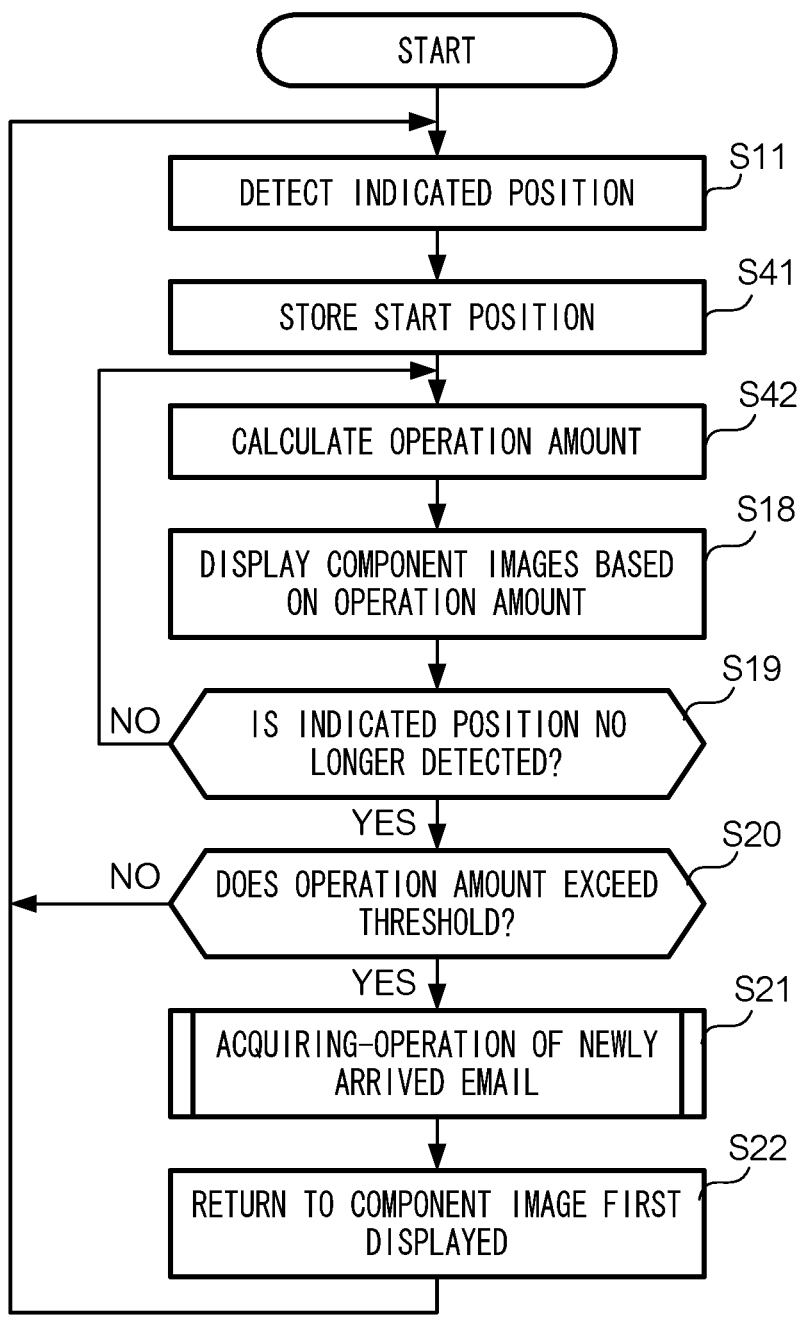
FIG. 13 is a flow chart illustrating an example of operating procedures in an operation-startup processing.

FIG. 13 is a flow chart illustrating an example of operating procedures that display device 1 executes in the operation-startup processing according to the present modification. Display device 1 executes an operation of step 11 shown in FIG. 4 to detect an indicated position. Display device 1 subsequently stores a time at which a detection of the indicated position is started (referred to as a start time) (step S41). Display device 1 subsequently calculates, as an operation amount, a time passed from the start time (step S42). Then, display device 1 displays component images based on the operation amount at step S18, and then determines whether the indicated position is no longer detected at step S19. When it is determined that the indicated position is detected (step S19: NO), display device 1 returns to step S42 to repeat operations. Meanwhile, when it is determined that the indicated position is no longer detected (step S19: YES), display device 1 executes operations on and after step S20 as the embodiment. These operations of steps S41 and S42 are executed by calculating unit 103 shown in FIG. 2. According to the present modification, a user can instruct execution of the specific operation by performing a so-called long press operation, in which a position on display surface 31 is continuously indicated during a time greater than a determined time. This enables a user to be provided with an operational feeling different from that of the foregoing embodiment or modifications.

It is to be noted that in a case where a time passed from when an indication is started is used as an operation amount as described above, display device 1 may increase or decrease an operation amount depending on an indicated position. For example, display device 1 may increase an operation amount when list image 330 shown in FIG. 3 is indicated. On the other hand, display device 1 may decrease an operation amount when either of device image 310 and email software image 320 is indicated. This allows a user to cancel an execution of the specific operation by indicating either of device image 310 and email software image 320 as described in the foregoing modification, when the user desires to cancel an execution of the specific operation after once performing an operation to display component image C4 by indicating list image 330.

In another embodiment, display device 1 may execute the specific operation by not only the foregoing drag operation or long press operation, but also another operation, such as a double-tap in which a short indication is repeated twice in succession, an operation to indicate determined areas in series, or an operation to move a displayed image to a predetermined position by a drag operation. In any of these cases, display device 1 basically calculates an operation amount represented by a distance or time based on a result of a detection of a position indicated by a user performing this kind of operation.

(Modification 10)

In the foregoing embodiment, display device 1 displays, as a list image, an image representing a list of a plurality of received emails. Display device 1 may, however, display, as a list image, an image representing other information. For example, display device 1 displays an image representing a list of transmitted emails, or an image representing a list of registered email addresses. In another example, display device 1 may display an image representing a list of search results on a search site, or an image presenting a list of messages posted on a SNS site by executing, for example, a browser program.

In the foregoing embodiment, display device 1 displays email images in a descending chronological order based on a date and time of receipt of each email. Display device 1 may, however, display email images in another order. For example, display device 1 may arrange email images in alphabetical order according to an email address, from which an email is transmitted, or in a Japanese syllabary order according to a subject of an email. In another embodiment, display device 1 may vary a display order depending on whether an email has an attached file, or an email is selected by a user. In summary, display device 1 arranges a plurality of items of information to allow a user easily to look for desired information (in the embodiment, an email).

(Modification 11)

In the foregoing embodiment and modifications, display device 1 executes the operation-startup processing while a list image, namely, an image in which a plurality of items of information is contained, is displayed on display surface 31; however, the present invention is not limited to this example. For example, display device 1 may execute the operation-startup processing while a detailed image of an email (an image representing detailed content of an email) is displayed. In another example, display device 1 may execute the operation-startup processing any time during which email software is executed regardless of an image displayed on display device 1. In summary, display device 1 may display any image (not limited to a list image) when executing the operation-startup processing.

(Modification 12)

In the foregoing embodiment, display device 1 executes, as the specific operation, the acquiring operation of a newly arrived email at step S21 shown in FIG. 4, but may execute another specific operation. For example, display device 1 may execute, as the specific operation, an operation for transmitting an email. In this case, display device 1 may determine whether an operation direction (a direction of a drag operation) is in line with the downward direction as in the embodiment, but that an operation direction is in line with another direction. For example, display device 1 determines whether an operation direction is in line with the upward direction. When a user holds display device 1 in user's hand, display device 1 may often enter such a state that the top of display surface 31 is more distant from the user than the bottom of display surface 31. Thus, performing a user's input operation in the upward direction to transmit an email enables a user to be provided with a feeling of holding out the email to another person.

In another embodiment, for example, when data is transmitted from a server to display device 1 by push communications, display device 1 may execute, as a specific operation, an operation for receiving the data. In this case, display device 1 may execute the specific operation when, for example, a path of detected indicated positions forms a circle as described in the foregoing modification. In this case, a user easily associates an operation method with content of the specific operation that a user desires to execute such that receipt of data is permitted by an operation to draw a circle. This allows a user easily to recall an operation method even if the user forgets the operation method. As described above, display device 1 may execute an addition of an operation amount when being operated in an operation method that is easily accorded with content of the specific operation. This allows a user easily to recall an operation method or to operate intuitively even if the user is ignorant of the operation method.

In another embodiment, display device 1 may execute, as the specific operation, an operation without data communications. For example, when a program for displaying an image stored in display device 1 is running, display device 1 may execute an operation for switching a displayed image in the same way as the specific operation. In this case, executing unit 105 shown in FIG. 2 is implemented by control unit 10 and storage unit 51 shown in FIG. 1. In this case, display device 1 may determine whether there is an image to be switched when, for example, the operation-startup processing is started, and may vary a moving image to be displayed depending on whether it is determined that the image exists. For example, when it is determined that the image exists, display device 1 may vary a moving image in several ways. On the other hand, when it is determined that there is no corresponding image, display device 1 may prevent a moving image from varying, or may display a character speaking a line "no more images" in a balloon. This enables display device 1 to notify whether the specific operation can be executed before a user terminates a user's input operation that is performed to execute the specific operation.

(Modification 13)

In the foregoing embodiment, even if a user performs a drag operation to list image 330 at steps S13 and S14 shown in FIG. 4, display device 1 prevents the operation-startup processing from proceeding when the latest email image is not displayed; however, the present invention is not limited to this example. For example, display device 1 may proceed with the operation-startup processing even in this case. This allows a user to instruct execution of both the scrolling display of a list image and the operation-startup processing in parallel. In another embodiment, display device 1 may prevent the operation-startup processing from proceeding when a start position is on list image 330 even if the last email image is displayed. This causes the acquiring operation of a newly arrived email never to be executed without a user's intention while a user operates a list image.

In another embodiment, display device 1 may preferentially execute a predetermined operation either of scrolling of a list image or the operation-startup processing. In this operation, for a priority operation, display device 1 may decrease an acceptable range of offset of an operation direction; while, for another operation, display device 1 may increase the acceptable range of offset of an operation direction. For example, in a case where display device 1 executes the operation-startup processing preferentially, a user carefully moves a finger such that a direction in which the finger moves is in line with the downward direction to execute the acquiring operation of a newly arrived email; meanwhile, the user moves the finger offset a little from the downward direction to scroll a list image. This allows a user to instruct execution of another operation by only varying an input operation method slightly (in this example, by only varying a direction in which a finger moves). In addition, a moving image is displayed when the operation-startup processing is received. This allows a user to recognize immediately whether an intended input operation is received.

In the foregoing description, an operation of a list image is described as an example; however, the same operation may be executed if another image is operated. In summary, when a user's input operation to a displayed image is common with a user's input operation to execute the operation-startup processing, display device 1 may receive both user's input operations, or may receive only either priority operation of the user's input operations. In this case, display device 1 may determine which operation to receive depending on whether a predetermined condition regarding a start position or a displayed image (in the embodiment, a condition whether a newly arrived email is displayed) is satisfied.

In addition to these methods, display device 1 may vary acceptable ranges of offset of two operations as described above.

(Modification 14)

In the foregoing embodiment, display device 1 displays an email image representing an acquired newly arrived email as step S21 shown in FIG. 4. Display device 1, however, does not have to display this email image. For example, display device 1 maintains a display of an email image displayed at a start position without changing a position even after the specific operation is executed to prevent varying of a position and content of an image included in a list image. In this case, a user confirms that the specific operation is executed by a movement of a displayed moving image. In a case where the moving image shown in FIG. 7 is displayed, a user can confirm that a user's input operation is received and the specific operation is executed by viewing component image C4 that is displayed even after a drag operation is terminated. Then, a user can confirm that an execution of the specific operation is terminated when a displayed image is switched from component image C4 to component image C1.

(Modification 15)

In the foregoing embodiment, display device 1 returns to displaying component image C1 when the acquiring operation of a newly arrived email is terminated at step S22 shown in FIG. 4. Display device 1 may, however, return to displaying a component image when, for example, the acquiring operation of a newly arrived email is started. In this case, when a moving image returns to a first state, a user can recognize that a receipt of a user's input operation is completed, and an execution of the acquiring operation of a newly arrived email is started. In addition, in this case, when a list image is updated, a user can recognize that the acquiring operation of a newly arrived email is terminated. As described above, display device 1 may return to displaying a component image first displayed in the foregoing display order when an execution of the specific operation is started or is terminated.

(Modification 16)

In the foregoing embodiment, display device 1 displays a component image before an indicated position is detected. Display device 1 may, however, start to display a component image when an indicated position is detected. In this case, a user can recognize that a user's input operation is received by a variation of a displayed content that a component image that is hidden until then is displayed. On the other hand, when a component image is displayed before an indicated position is detected as the embodiment, in addition to a user being able to recognize that a user's input operation is received by viewing a displayed moving image, a user can be sure to confirm a first movement in a moving image by paying attention to a component image from starting of a user's input operation. This operation for displaying a component image is executed by moving-image-control unit 104 shown in FIG. 2.

(Modification 17)

It is understood that the present invention may provide not only a display device, such as display device 1, but also a method for implementing a process executed by the display device. The process referred to here is, for example, a process executed by display device 1 in the operating procedures shown in FIG. 4. In another embodiment, it is understood that the present invention may provide a program that causes a computer including a display unit and touch sensor as display device 1 to operate as the means shown in FIG. 2. Such a program may be provided while being stored in a recording medium, such as an optical disk, or may be provided while being downloaded into the computer via a network, such as the Internet, and being installed on the computer to make the program available.

What is claimed is:

1. A display device comprising:
a display configured to display an item image including an item on a display surface and a list image on the display surface, the list image including a plurality of items of information in a list in a predetermined order;
a touch sensor configured to detect a drag operation performed on the display surface by a user using a finger or a stylus pen from a start position to a shifted position, the drag operation not being performed on the item on the display surface; and
a controller configured to:
calculate an operation amount and an operation direction of the detected drag operation;
wherein when the start position of the drag operation is within the item image or within the list image, and when the operation direction is a first direction, the controller configured to:
vary the display of the item between a plurality of sequential component images based on the calculated operation amount to display a moving image of the item within the item image while the drag operation is being performed; and
execute a determined operation for acquiring an email that is newly arrived to display on the display an email image that represents content of the acquired email when the calculated operation amount exceeds a threshold; and
wherein when the start position of the drag operation is within the list image and when the operation direction is a second direction, the controller configured to execute another operation for displaying another email image that represents content of another email from among the plurality of items of information.

2. The display device according to claim 1, wherein the controller is further configured to return to displaying a component image first displayed in the plurality of sequential component images when the controller starts to execute or terminates the determined operation.

3. The display device according to claim 1, wherein:
the plurality of sequential component images includes a plurality of first component images and a second component image, the plurality of first component images being displayed in a predetermined order, a content of the moving image having a first variation, the second component image being displayed subsequent to the plurality of the first component images, the content having a second variation other than the first variation; and
the controller is further configured to display the plurality of first component images while switching the plurality of first component images in the predetermined order until the calculated operation amount reaches the threshold, and to display the second component image by switching from a last of the plurality of first component images when the calculated operation amount exceeds the threshold.

4. The display device according to claim 1, wherein the controller is further configured to display the plurality of sequential component images while switching the plurality of sequential component images from being displayed in a predetermined order to a reverse order from the predetermined order when the calculated operation amount becomes smaller than a threshold.

5. The display device according to claim 1, wherein the controller is further configured to:
display an image representing an item of information from among a plurality of items of information; and
execute an operation to acquire information other than the item of information from among the plurality of items of information when the calculated operation amount exceeds the threshold.

6. The display device according to claim 1, wherein the controller is further configured to, within the calculate and vary steps:
in response to detecting the shifted position, calculate, as the calculated operation amount, a shifted distance from the start position for a shift to the shifted position, or calculate, as the calculated operation amount, a distance from the start position to the shifted position along a predetermined direction; and
execute the determined operation when a period of time from when the shift is started to when the calculated operation amount is calculated is greater than a predetermined value, or is smaller than another predetermined value;
wherein the predetermined value and the another predetermined value are periods of time elapsing before the calculated operation amount exceeds the threshold.

7. The display device according to claim 1, wherein the controller is further configured to:
in response to detecting the shifted position, calculate, as the calculated operation amount, a shifted distance from the start position for a shift to the shifted position, or calculate, as the calculated operation amount, a distance from the start position to the shifted position along a predetermined direction; and
execute the determined operation when the shifted position is no longer detected while the calculated operation amount exceeds the threshold.

8. The display device according to claim 7, wherein the controller is further configured to:
display an image representing an item of information from among a plurality of items of information; and
calculate, as the calculated operation amount, a distance from the start position to the shifted position along the predetermined direction using a direction in which the item of information is arranged as the predetermined direction.

9. The display device according to claim 7, wherein the controller is further configured to execute the determined operation when a period of time from when the shift is started to when the shifted position is no longer detected is greater than a predetermined value, or is smaller than another predetermined value, and when the calculated operation amount exceeds the threshold and the shifted position is no longer detected by the detecting means.

10. The display device of claim 1, wherein the controller is further configured to switch the display of the plurality of sequential component images from being displayed in a predetermined display order to a reverse order from the predetermined order.

11. A program stored on a Non-Transitory Computer Readable Medium, the program for causing a controller of a display device configured to display an item image including an item on a display surface and a list image on the display surface, the list image including a plurality of items of information in a list in a predetermined order, and a touch sensor configured to detect a drag operation performed on the display surface by a user using a finger or a stylus pen from a start position to a shifted position, the drag operation not being performed on the item on the display surface, the controller configured to execute the steps of:
  calculating an operation amount and an operation direction of the detected drag operation;
  wherein when the start position of the drag operation is within the item image or within the list image, and when the operation direction is a first direction, the controller is configured to execute the steps of:
    varying the display of the item between a plurality of sequential component images based on the calculated operation amount to display a moving image of the item within the item image while the drag operation is being performed; and
    executing a determined operation for acquiring an email that is newly arrived to display on the display an email image that represents content of the acquired email when the calculated operation amount exceeds a threshold; and
  wherein when the start position of the drag operation is within the list image and when the operation direction is a second direction, the controller is configured to execute another operation step of displaying another email image that represents content of another email from among the plurality of items of information.

12. The program according to claim 11, wherein the program causes the controller to execute the step of switching the display of the plurality of sequential component images from being displayed in a predetermined display order to a reverse order from the predetermined order.

\* \* \* \* \*